(12) United States Patent
Saarinen (10) Patent No.: US 9,376,260 B2
(45) Date of Patent: Jun. 28, 2016

(54) CONVEYOR BODY AND MOBILE MINERAL MATERIAL PROCESSING PLANT

(71) Applicant: Metso Minerals, Inc., Helsinki (FI)

(72) Inventor: Lauri Saarinen, Sahalahti (FI)

(73) Assignee: Metso Minerals, Inc., Helsinki (FI)

( * ) Notice: Subject to any disclaimer, the term of this patent is extended or adjusted under 35 U.S.C. 154(b) by 8 days.

(21) Appl. No.: 14/174,346

(22) Filed: Feb. 6, 2014

(65) Prior Publication Data

US 2015/0217942 A1 Aug. 6, 2015

(51) Int. Cl.
| | |
|---|---|
| *B65G 15/26* | (2006.01) |
| *B65G 21/14* | (2006.01) |
| *B07B 11/06* | (2006.01) |
| *B07B 1/00* | (2006.01) |
| *B65G 41/00* | (2006.01) |

(52) U.S. Cl.
CPC ............... *B65G 21/14* (2013.01); *B07B 1/005* (2013.01); *B07B 11/06* (2013.01); *B65G 41/005* (2013.01)

(58) Field of Classification Search
CPC .... B65G 21/14; B65G 41/001; B65G 41/002; B65G 41/005
USPC ............ 198/300–320, 632, 861.1–861.6
See application file for complete search history.

(56) References Cited

U.S. PATENT DOCUMENTS

| | | | | |
|---|---|---|---|---|
| 2,674,364 | A | * | 4/1954 | Cartlidge ...................... 198/303 |
| 2,856,061 | A | * | 10/1958 | Seigle et al. ............... 198/861.2 |
| 3,008,566 | A | * | 11/1961 | Biedess ......................... 198/725 |
| 3,100,563 | A | * | 8/1963 | Biedess ...................... 198/861.2 |
| 5,577,618 | A | * | 11/1996 | Rafferty ........................ 209/421 |
| 6,662,939 | B1 | * | 12/2003 | McCusker et al. ......... 198/861.1 |
| 7,552,818 | B2 | * | 6/2009 | Makinen et al. ........... 198/861.2 |
| 2014/0367222 | A1 | * | 12/2014 | Byrne et al. .................. 198/588 |

FOREIGN PATENT DOCUMENTS

| | | |
|---|---|---|
| EP | 0641607 A2 | 3/1995 |
| WO | 2013057300 A2 | 4/2013 |

OTHER PUBLICATIONS

International Search Report for PCT/FI2015/050022 dated Mar. 31, 2015.

* cited by examiner

*Primary Examiner* — William R Harp
(74) *Attorney, Agent, or Firm* — Andrus Intellectual Property Law, LLP (57) ABSTRACT

A conveyor body for conveying mineral material includes a middle section having a first end and a second end, and a first pivot axis passes through the first end of the middle section, and the middle section is arranged to be pivoted around the first pivot axis from an operation position of the conveyor to a transport position and back to the operation position, and a second pivot axis passes through the second end of the middle section to pivot a head section sideways around the second pivot axis from the operation position of the conveyor which head section is connectable to the middle section through the second pivot axis, wherein the middle section includes a top plate, a bottom plate, and vertical side plates which are fixed between the top plate and the bottom plate. A mineral material processing plant is also disclosed.

22 Claims, 4 Drawing Sheets

CONVEYOR BODY AND MOBILE MINERAL MATERIAL PROCESSING PLANT

TECHNICAL FIELD

The invention relates to a conveyor body and a mineral material processing plant. The invention relates particularly, though not exclusively, to a mineral material processing plant which comprises a side conveyor and which is able to process such as crush, pre-screen, screen and/or transport further mineral material.

BACKGROUND ART

Rock is gained from the earth for crushing by exploding or excavating. Rock can also be natural rock and gravel or construction waste. Mobile processing plants (for example crushing and/or screening plants) and stationary processing applications are used in the processing (for example crushing). An excavator or wheeled loader loads the material to be processed into the processing plant's feed hopper from where the material to be processed ends up to a feeder or screen which feeds the material to a processing apparatus for example a crushing chamber or the feeder moves the stone material towards the crusher. Desired material for example fine material can be directed through the feeder and/or the screen to a side conveyor that this material does not result in further processing for example crushing in a processing apparatus. A usual location of the side conveyor is under the feeder or the screen where selected material can drop. Material directed past the further process in the same plant is conveyed aside the processing plant by means of the side conveyor, for example, in a pile or to be processed further for example in another processing plant.

In mobile crushing plants the side conveyor forms during transportation an obstacle which broadens the crushing plant and which has to be located, at least in road traffic, in a narrower space than an operating position of the side conveyor. Usually, the side conveyor is pivoted at a side of the plant for the time of the transportation hydraulically upwards in a vertical position. In some cases an end of the conveyor is pivoted to a longitudinal side of the plant. The conveyor is then, for example, of a model which is foldable at a region of a conveyor belt. Hydraulic cylinders and pivots are used in the structure of the conveyor which is pivotable at the side of the plant.

Many different-size modifications were made of the body of the conveyor for different-size processing plants what makes manufacturing of the product complicated and slow and increases manufacturing costs. Typically the conveyor body is made by welding tube parts and plate parts joined thereto. Each different-size section of the conveyor body requires a precise welding jig what generates costs. Locating of the many parts to each other takes time.

An object of the invention is to avoid or reduce problems related to prior art and/or to provide new technical alternatives.

SUMMARY

According to a first aspect of the invention there is provided a conveyor body for conveying mineral material which comprises a middle section having a first end and a second end, and a first pivot axis passes through the first end of the middle section, and the middle section is arranged to be pivoted around the first pivot axis from an operation position of the conveyor to a transport position and back to the operation position, and a second pivot axis passes through the second end of the middle section to pivot a head section sideways around the second pivot axis from the operation position of the conveyor which head section is connectable to the middle section through the second pivot axis, wherein the middle section comprises a top plate, a bottom plate, and vertical side plates which are fixed between the top plate and the bottom plate.

Preferably both vertical side plates comprise a first fixing hole for the first pivot axis in the first end of the middle section.

Preferably the top plate and the bottom plate both comprise a hole for the second pivot axis in the second end of the middle section.

Preferably the middle section is narrowing towards the second end of the middle section.

Preferably the top plate and the bottom plate are narrowing towards the second end of the middle section.

Preferably front ends of the vertical side plates are arranged from sides of the middle section inwards and converging towards the second end of the middle section.

Preferably the first pivot axis and the second pivot axis are substantially perpendicular.

Preferably the conveyor body comprises a load section to which the middle section is connected through the first pivot axis; and at least one first hydraulic cylinder having a first end which is connected to the load section and a second end which is connected to a fixing part comprised by the middle section.

Preferably the fixing part is integrated to the vertical side plate and arranged to pass through a first opening formed to the bottom plate.

Preferably a second hydraulic cylinder is connected to the middle section to pivot the head section around the second pivot axis.

Preferably the second hydraulic cylinder is fixed to the top plate or to the bottom plate.

Preferably the second hydraulic cylinder is fixed to the side plate, and located above the top plate or under the bottom plate.

Preferably the second hydraulic cylinder is fixed between the top plate and the bottom plate.

Preferably the conveyor body comprises a head section and the head section comprises an adapting part having a pivot in its first end which pivot is connected to the middle section through the second pivot axis; and the conveyor body comprises a second hydraulic cylinder having a first end which is connected to the middle section and a second end which is connected to an adapting part comprised by the head section.

Preferably the adapting part comprises: a lid; first vertical walls at sides of the lid being arranged converging towards the first end of the adapting part; a second vertical wall at a second end of the adapting part; and a bottom to which said vertical walls are fixed.

Preferably the head section comprises: longitudinal beams which are attached to the adapting part; and roller assembly supports which are attached to the longitudinal beams.

According to a second example aspect of the invention there is provided a mineral material processing plant comprising a mobile frame; at least one mineral material processing apparatus attached to the frame; and at least one conveyor body which comprises a middle section having a first end and a second end, and a first pivot axis passes through the first end of the middle section, and the middle section is arranged to be pivoted around the first pivot axis from an operation position of the conveyor to a transport position and back to the operation position, and a second pivot axis passes through the second end of the middle section to pivot a head section sideways around the second pivot axis from the operation position of the conveyor which head section is connectable to the middle section through the second pivot axis, wherein the middle section comprises a top plate, a bottom plate, and vertical side plates which are fixed between the top plate and the bottom plate.

Preferably the middle section is pivoted substantially to the vertical position and a head section connected to the middle section is pivoted to a substantially horizontal position beside a longitudinal side of the processing plant when the conveyor body is pivoted to the transport position.

Preferably the processing plant comprises as the mineral material processing apparatus at least one of the following: a feeder, a pre-screen, a screen, a crusher, a discharge conveyor.

Preferably the conveyor body is operated as a side conveyor which is pivotable to the transportation position in direction of a frame of a mobile processing plant so that a transportation width of the processing apparatus is not exceeded. The transportation width is preferably a transportation width of a vehicle which is transported in road traffic without an abnormal transport permit. Usually, the mobile processing plants are dimensioned at their broadest point (for example, frame, tracks or wheels) inside this transportation width.

When the conveyor body is formed of open structures finishing and particularly hot dip galvanizing can be realized without particular draining openings, and endings of weld seams can be avoided in places which are critical with regard to stresses. Additionally, quality control after the hot dip galvanizing is facilitated.

Different embodiments of the present invention will be illustrated or have been illustrated only in combination with one or some aspects of the invention. A person skilled in the art understands, that any embodiment of one aspect of the invention may be applied in the same aspect of the invention and in other aspects alone or as a combination with other embodiments.

Various other features, objects and advantages of the invention will be made apparent from the following description taken together with the drawings.

BRIEF DESCRIPTION OF THE DRAWINGS

The invention will be described, by way of example, with reference to the accompanying drawings.

DETAILED DESCRIPTION

In the following description, like numbers denote like elements. It should be appreciated that the illustrated drawings are not entirely in scale, and that the drawings mainly serve the purpose of illustrating embodiments of the invention.

FIGS. 1-7 show a conveyor body 100 which comprises a load section 101, a middle section 102 and a head section 103 for a conveyor. The names of the sections refer to the physical positions thereof in the conveyor body. The conveyor body 100 is preferably fixed to a mineral material processing plant 200 shown in FIG. 9 in which mineral material can be processed for example by crushing, pre-screening, screening and/or transporting further. The conveyor with the conveyor body is arranged to receive and transport mineral material for example from a screen, a crusher, a conveyor or a corresponding mineral material processing apparatus. The conveyor body 100 is suitable for a body of a side conveyor. The body 100 shown in the Figures is supplemented to an operational conveyor with an endless transport member (for example a conveyor belt), support members supporting the transport member (for example rollers and/or glide members), hydraulic hoses, covers and if necessary a feed chute (not shown in the Figures).

Figure 1:
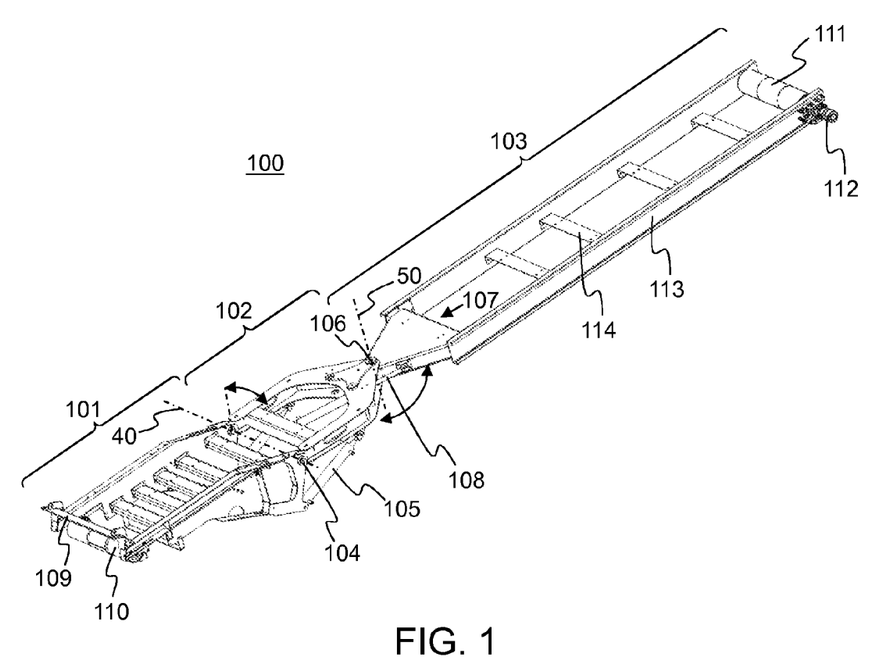
FIG. 1 shows a conveyor body according to a preferable embodiment comprising a load section, a middle section and a head section.

The conveyor body 100 comprises a first pivot axis 40 around which the middle section 102 is arranged to pivot from an operation position of the conveyor to a transport position and back to the operation position in relation to the processing plant 200 and particularly in relation to the load section 101. Preferably the middle section is in the transport position pivoted upwards to a substantially vertical position, preferably to a longitudinal side of the processing plant 200. The substantially vertical position of the middle section means in this description the vertical position of the middle section and positions pivoted 0 to 10° from the vertical position in both pivot directions around the first pivot axis 40. In FIG. 1 the pivot direction of the middle section is upwards to the transport position from the operation position and back downwards to the operation position. According to some embodiments the pivot direction of the middle section is downwards to a transport position from the operation position and back upwards to the operation position (not shown in the Figures).

The middle section 102 is fixed and pivoted from its first end 102' to a second end of the load section 101 by first pivot pins 104 which are located at both sides of the conveyor body (alternatively by an undivided shaft which extends to both sides of the conveyor body). Fixing holes of the pivot pins 104 are integrated to side plates of the load section and to vertical plates of the middle section. A pair of first hydraulic cylinders 105 (in some embodiments one hydraulic cylinder) is mounted between the load section 101 and the middle section 102 for vertical pivoting of the middle section 102 (and so the conveyor body 100). A first end of the hydraulic cylinder 105 is attached to the load section at a first distance from the first pivot axis (substantially below the first pivot axis) and second end of the hydraulic cylinder is attached to the middle section at a second distance from the first pivot axis (the first distance may be equal as the second distance or different).

The conveyor body 100 comprises a second pivot axis 50 around which the head section 103 is arranged to pivot in relation to the middle section 102 sideways from the operation position of the conveyor, preferably in the direction of the longitudinal side of the processing plant, for example when the middle section 102 is pivoted to the vertical position, and back to the operation position. The head section 103 is fixed and pivoted from its first end to a second end 102" of the middle section 102 by a second pivot pin 106 which is located preferably substantially at a centre line of the conveyor body. The second end of the middle section 102 converges towards the head section 103. The head section 103 comprises in the first end an adapting part 107 which converges towards the middle section. Preferably the middle section and the head section are pivoted to each other by the second pivot pin 106 at the converging ends thereof. A second hydraulic cylinder 108 is mounted as an actuator between the middle section and the head section for sideways pivoting of the conveyor body 100. The actuator may also be an electromechanical actuator.

Figure 2:
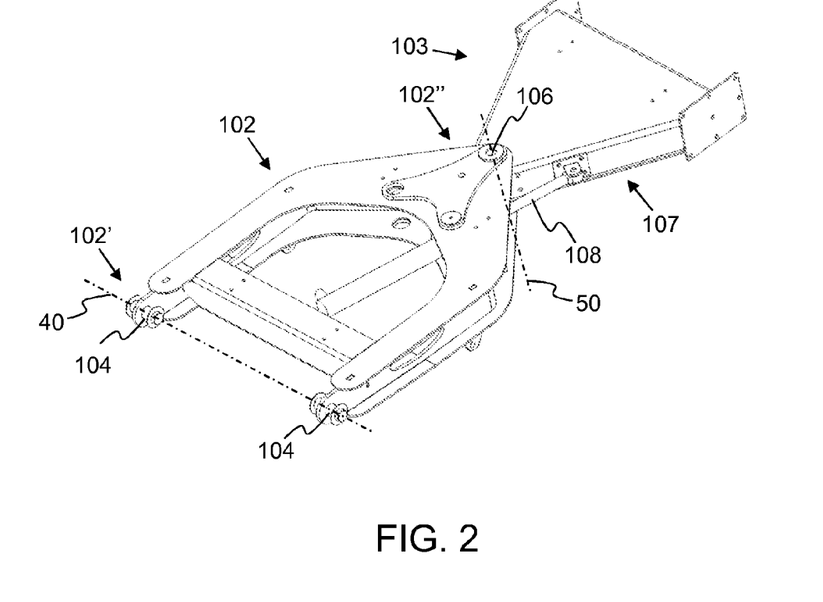
FIG. 2 shows a middle region of the body of FIG. 1 where the middle section is pivoted to an adapting part of the head section.

In FIGS. 1 and 2 the second hydraulic cylinder 108 is fixed between the top plate 1 and the bottom plate 2, preferably to the top plate and to the bottom plate. When the second hydraulic cylinder 108 which pivots the head section 103 sideways is mounted inside the structure it is protected as well as hydraulic connectors and a hydraulic piping. This fixing means enables fixing a first end of the hydraulic cylinder near an exit point of a piston rod and at the same time the first end of the hydraulic cylinder is allowed to move freely protected by top and bottom plates of the middle section. When the second hydraulic cylinder 108 is fixed to the top plate 1 and/or the bottom plate 2 near the exit point of the piston rod the fixing point of the second hydraulic cylinder 108 can be selected in a suitable way in a side direction of the middle section.

Preferably the first pivot axis 40 and the second pivot axis 50 are perpendicular to each other. Preferably the first pivot axis 40 is arranged in a direction of a horizontal plane when the load section 101 is attached to the processing plant which is located on a base which has the direction of the horizontal plane.

Figure 9:
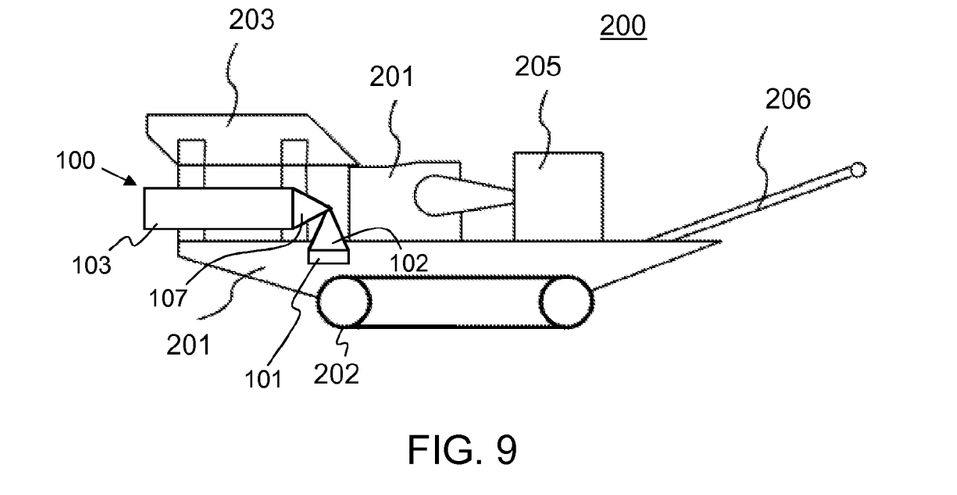
FIG. 9 shows a mineral material processing plant which comprises a conveyor body according to an embodiment of the invention.

The head section 101 is attached to the processing plant 200 by an adapting member 109 which is fixed to a first end of the load section. A first idler 110 is fixed to the first end of the load section 101 and a second idler 111 is fixed to a second end of the head section, in other words to a discharge end of the conveyor body 100 for supporting and rotating 180° a conveyor belt at both ends of the conveyor body. The second idler is equipped with a drive 112 which preferably is a hydraulic motor.

The adapting part 107, longitudinal beams 113 (preferably open longitudinal plate structures 113) and roller assembly supports 114 are joined to each other in the head section 103 preferably by bolts. The longitudinal beams form a protective structure for the rollers and the conveyor belt to be located on the roller assembly supports. Electric cabling and hydraulic piping can be located in a protected place at preferably open sides of the longitudinal beams 113 and open spaces can be covered by plate covers (not shown in the Figures). Transportation of the head section is more effective than previously because the head section can be transported in parts due to the bolted structure.

The parts of the conveyor body 100 which are assembled of preferably open pieces such as for example side wall structure of the load section and box structure of the head section which are cut of plates, bent and welded; and open box/beam structure of the middle section; the longitudinal and cross beams made of open plate structures are simple to store, finish and make suitable in length, surface finish (for example hot dip galvanize), transport and finally join. A total number of welded parts can thus be kept small.

A simple structure of the middle region of the conveyor body and especially of the middle section 102 enables keeping a number of parts small and enables through standardization easy manufacturing of the conveyor body with uniform quality at as many as possible suppliers. A production number of parts can be increased when same parts can be used in many different-sized conveyors. An increase of the order lots cheapens the product because cheaper purchase places can be found due to a volume advantage. According to an estimate two different sizes of standardized middle sections according to an embodiment of the invention are required today for different conveyor widths instead of earlier six different-size middle sections.

Figure 3:
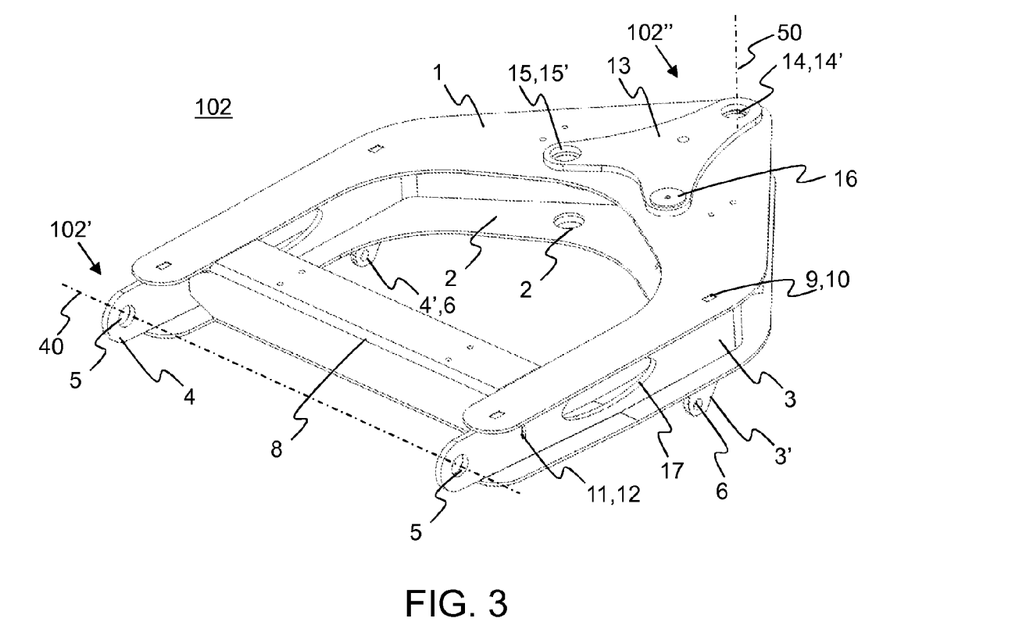
FIG. 3 shows a middle section according to a preferable embodiment.
Figure 4:
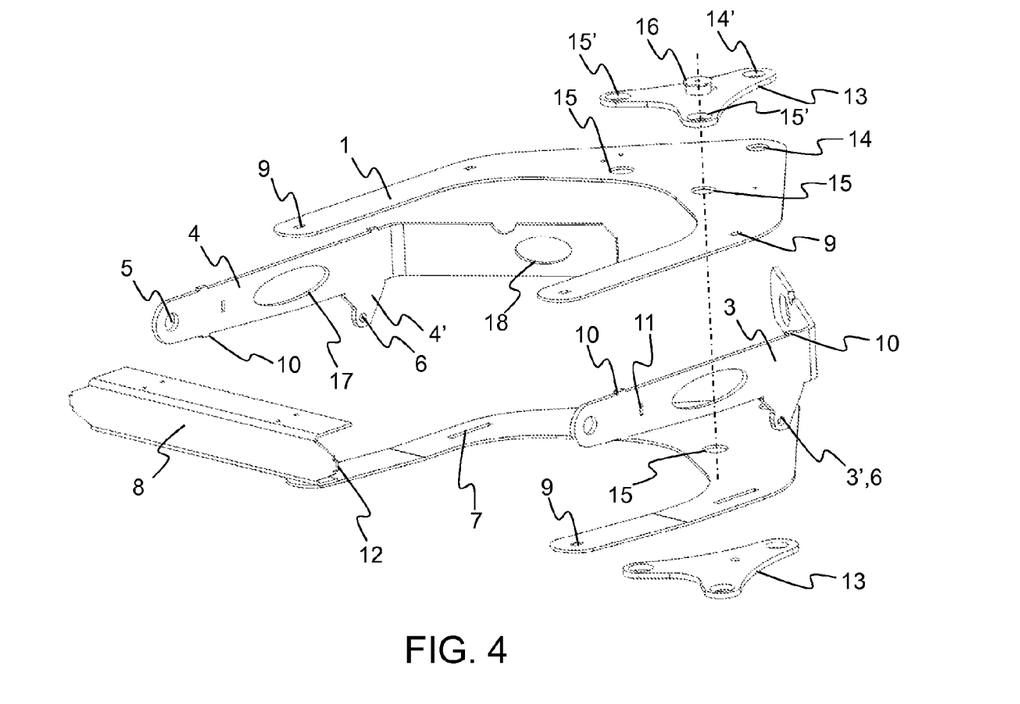
FIG. 4 shows parts of the middle section of FIG. 3.

FIG. 3 shows parts of a middle section 102 according to a first embodiment fixed to each other and FIG. 4 shows the parts of the middle section separately.

The middle section comprises a top plate 1, a bottom plate 2 and two side plates 3, 4 which are fixed between the top and bottom plates. First fixing holes 5 are arranged to rear ends (in the first end of the middle section) of the vertical side plates 3 and 4 for the first pivot pins 104 of the first pivot axis 40. The rear ends of the vertical side plates 3 and 4 and thus the fixing holes 5 are arranged at sides of the middle section in the first end of the middle section.

The middle section 102 is preferably converging towards the direction of the second end 102" of the middle section. Preferably the top and bottom plates narrow (i.e. converge) inwards from the sides of the middle section towards a centre line of the middle section 102 in the second end 102" of the middle section. Preferably front ends of the side plates 3 and 4 are arranged (for example bent) inwards from the sides of the middle section in a converging way towards the centre line of the middle section 102. Preferably the front ends of the side plate are arranged at a distance from each other in the second end of the middle section. A location of the front ends of the side plates at the distance from each other forms a drainage opening for example in hot dip galvanizing.

The middle section 102 comprises fixing parts 3', 4' and second fixing holes 6 in these fixing parts for second ends of the first hydraulic cylinders 105. The fixing parts 3', 4' are preferably integrated to the vertical side plates 3 and 4. Preferably the fixing parts 3', 4' are arranged to pass through first openings 7 formed to the bottom plate 2.

The middle section 102 comprises in some embodiments a cross beam 8 which is fixed to the top plate 1, the bottom plate 2 and the side plates 3, 4 at a rear section of said plates. A roller or slide part supporting the endless transport member can be fixed on the cross beam 8 and on the top plate 1 what is illustrated with fixing holes formed to the cross beam and the top plate.

Second openings 9 are arranged in some embodiments of the middle section 102 to the top plate 1 and the bottom plate 2 to which second openings are positioned first projections 10 arranged to the side plates to position the bottom, top, and side plates to each other. Third openings 11 are arranged in a corresponding way to the side plates to which third openings are positioned second projections 12 arranged to the cross beam 8 to position the cross beam to the side plates and at the same time to the bottom and top plates.

The fixing parts 3', 4' being of same plate with the side plates and the first projections 10 and the second projections integrated to the cross beam enable a small number of the parts of the conveyor body, make the structure compact and strong, decrease an amount on joints and joining made mainly by welding and facilitate assembling. The positioning of the fixing parts and said projections to the openings 7, 9 and 11 in the top, bottom, and side plates forms part of an assembly arrangement and thus part of fixing arrangement in the welding (weldable parts form part of a welding jig) and simplifies and speeds up the positioning of the top, bottom, and side plates to each other.

Openings 17 are formed to the longitudinal sides of the side plates 3 and 4 for example for cables and hydraulic hoses going to the second hydraulic cylinder 108. Openings 18 are formed to the cross directed sides of the side plates in the second end of the middle section for the hydraulic cylinder 108, particularly for the piston rod thereof.

The middle section comprises in its second end support plates 13 for supporting the second pivot pin 106 for the second pivot axis 50 and for supporting a fixing of the second hydraulic cylinder 108 used for pivoting the head section 103. A top support plate 13 is fixed to the top plate 1 and a bottom support plate 13 is fixed to the bottom plate 2. The support plate 13 comprises second support holes 15' of which one is used together with hydraulic cylinder supporting holes 15 in the top and bottom plates. A fitting plate 16 can be mounted in both second support holes 15' to fix and bearing-mount the hydraulic cylinder 108.

The openings 17 and 18 formed on both sides of the centre line of the middle section, the second support holes 15' and the hydraulic cylinder supporting holes 15 enable placing the hydraulic cylinder 108 at a desired side of the centre line of the middle section to pivot the head section sideways to the right or to the left relative to a conveying direction of the conveyor.

The structure of the middle section 102 is formed open wherein installations get easy inside the middle section for example with regard to the second hydraulic cylinder 108. Additionally, welding and surface finishing of the middle section when assembled gets easier and quality enhances.

Figure 5:
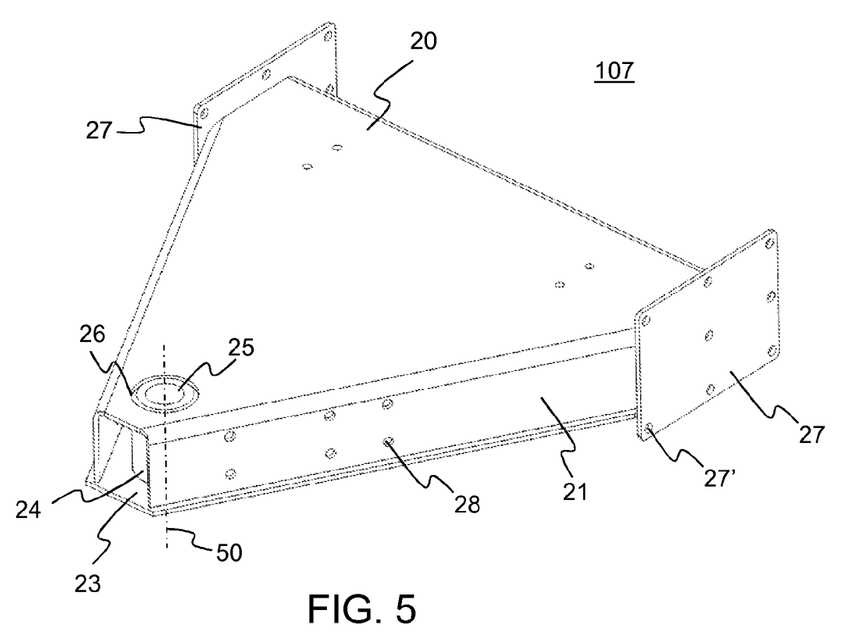
FIG. 5 shows an adapting part of the head section according to a preferable embodiment.
Figure 6:
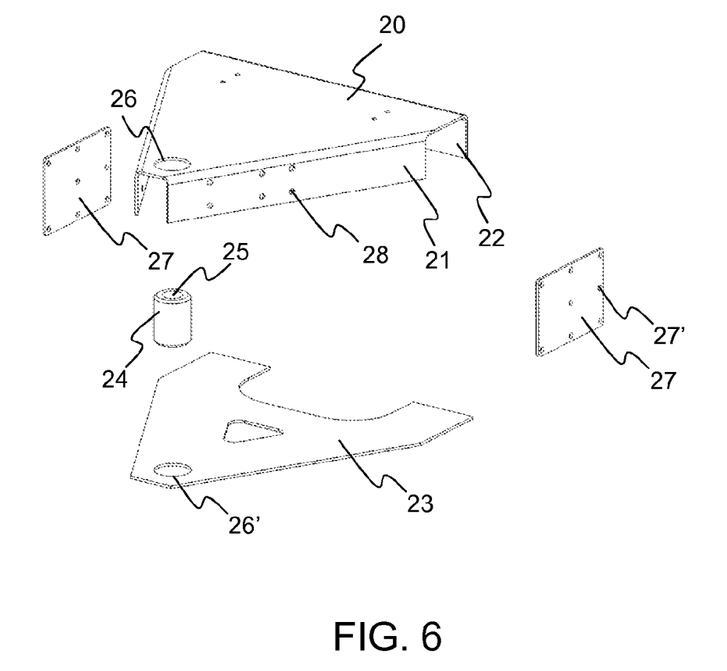
FIG. 6 shows parts of the adapting part of FIG. 5.

FIG. 5 shows an adapting part 107 of a head section 103 according to a preferable embodiment assembled and FIG. 6 shows the parts of the adapting part separately.

The adapting part 107 comprises a lid 20 having a top surface which is converging towards a first end of the head section. The adapting part comprises at sides of the lid first longitudinal walls 21 which are preferably bent downwards of a plate material of the lid. The adapting part comprises in a second end a second vertical wall 22 which is crosswise in relation to a longitudinal centre line of the head section and is preferably bent downwards of the plate material of the lid.

The adapting part 107 comprises a bottom 23 to which the vertical walls of the lid are fixed preferably by welding. The lid and the bottom form a box when assembled.

The adapting part 107 comprises in the first end a pivot 24 with a hole 25. The hole 25 of the pivot 24 is fixed to the lid 20 and the bottom 23. Preferably a sleeve forming the pivot is welded to a fourth opening 26 formed to the converging first end of the lid 20 and to a fifth opening 26' formed to a corresponding point in the bottom 23.

In FIG. 5 flanges 27 are fixed to the second end of a box formed by the lid 20 and the bottom 23 to fix profiles 113 at the sides of the head section through flange fixing holes 27' for example with screws. The box 20,23,27 forming a main part of the adapting part is arranged at the first end as an open structure along others by fixing the pivot 25 between the lid and the bottom wherein a surface finishing of the adapting part is facilitated.

Figure 7:
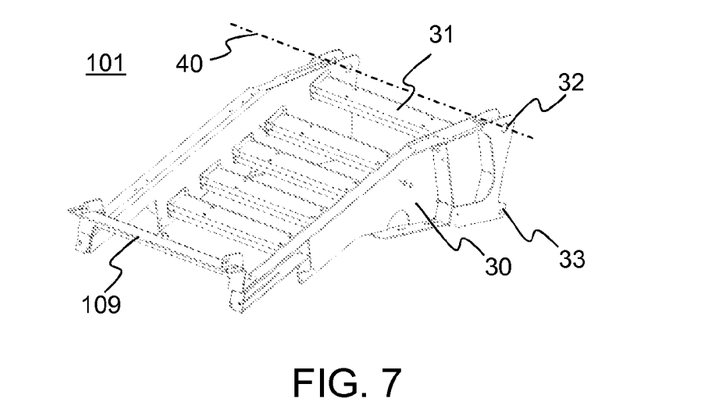
FIG. 7 shows a load section according to a preferable embodiment.

FIG. 7 shows a load section 101 according to a preferable embodiment with the adapting part 109 fixed to the first end of the load section. The load section comprises sides 30 which are joined to each other by cross beams 31. The cross beams are located with dense distances in the longitudinal direction to receive a load of a material loaded onto the conveyor. First pivot points 32 are arranged up to the sides 30 at a second end of the load section for the first pivot axis 40 and the first pivot pins 104. Second pivot points 33 are arranged to the sides 30 below the first pivot points 32 for fixing the first ends of the first hydraulic cylinders 105.

The locating of the pivot points of the first pivot axis 40 at the sides of the structure of the middle section 102 simplifies the load section 101 in which the pivot points can be integrated as part of plate structured sides 30. Preferably the sides are formed as an open structure of plates which are welded together. Load sections with different widths can be formed by selecting a desired length of the cross beams 31 to be joined. Preferably the cross beam can be formed open at a bottom by bending from a plate and welding fixing flanges at ends. The cross beam 31 can be fixed by bolting and part of the cross beams can be welded to the sides 30, if necessary. Transportation of the load section is more effective than previously because the load section can be transported in parts due to the bolted structure.

Figure 8:
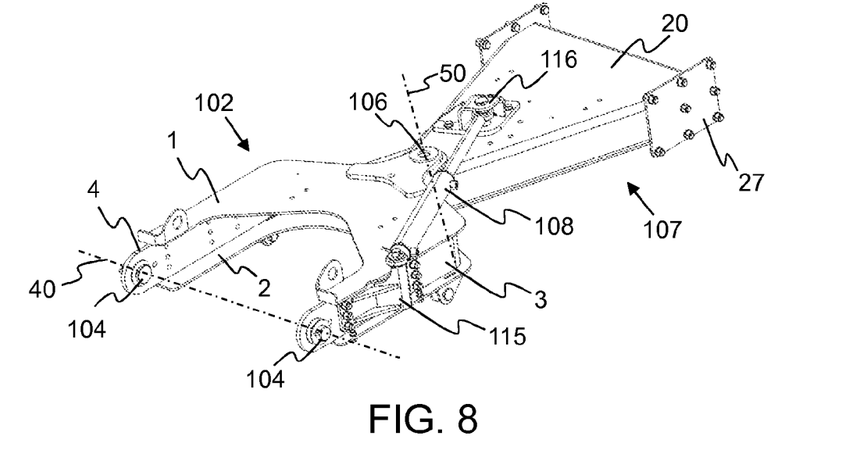
FIG. 8 shows an alternative middle region of the conveyor body.

FIG. 8 shows an alternative middle region of the conveyor body 100 in which the second hydraulic cylinder 108 is located above the middle section 102. The second hydraulic cylinder 108 is located above the top plate 1. Then a conveyor belt is adapted to travel above the second hydraulic cylinder 108. A first end of the cylinder 108 is fixed to a side of the middle section, preferably to the side plate 3, by a first fixing part 115. A second end of the cylinder 108 is fixed on the lid of the adapting part 107 by a second fixing part 116. That way of fixing provides for a possibility to select a fixing point of the second end of the cylinder at a region of the lid 20.

The top plate 1 of the middle section 102 extends closer to the first end of the middle section in the embodiment of FIG. 8. This alternative top plate solution can applied as well with the middle section shown in connection with FIG. 1 and the cross beam 8 of the middle section shown for example in FIGS. 3 and 4 can be left away.

According to some embodiments the second hydraulic cylinder 108 is fixed to one of the side plates 3,4 and located under the bottom plate 2 (not shown in the Figures).

According to some embodiments the second hydraulic cylinder 108 is fixed to the top plate 1 and located above the top plate (not shown in the Figures).

According to some embodiments the second hydraulic cylinder 108 is fixed to a bottom plate 2 and located under the bottom plate (not shown in the Figures).

FIG. 9 shows a mineral material processing plant 200. The plant 200 comprises a conveyor body 100 arranged as a side conveyor. The middle section 102 of the conveyor body is pivoted substantially to a vertical position and the head section 103 is pivoted longitudinally with regard to the plant 200 at the side of the plant 200 to a transport position. The head section is preferably lowered onto a support (not shown in the Figure).

The processing plant 200 of FIG. 9 comprises a feeder 203 for feeding material to a crusher 201 and a discharge conveyor 206 for transporting a crushed product farther from the processing plant. The processing plant 200 also comprises a power source and a control unit 205. The power source may be for example a diesel motor or an electric motor which provides energy for processing units and hydraulic circuits.

The feeder, the crusher, the power source, the side conveyor and the discharge conveyor are fixed to a frame 201 of the plant which frame in this embodiment also comprises a track base 202 for moving the processing plant. The processing plant may also be entirely or partly wheel based or movable on legs. Alternatively it may be movable/towable for example with a truck or another external power source. Additionally to the aforementioned the processing plant may also be a stationary processing plant.

The processing plant comprises at least one mineral material screen, conveyor or crusher. The mineral material processing plant can be a crushing plant which comprises a crusher as a processing apparatus. The crusher can be for example a jaw crusher, a cone crusher, a gyratory crusher or an impactor crusher. The mineral material processing plant can be a screening plant which comprises a screen as a processing apparatus. The screen may be a screen with one or more decks, for example a vibrating screen. The screen may be a 2-deck, 3-deck or a 4-deck screen. The screen may be a pre-screen such as a grizzly feeder or a scalper. The mineral material processing plant can be a combined crushing and screening plant which comprises a crusher and a screen as processing apparatuses.

In the following, example embodiments 1 to 19 are listed:

Example 1

A conveyor body 100 for conveying mineral material comprises a middle section 102 having a first end 102' and a second end 102", and a first pivot axis 40 passes through the first end of the middle section, and the middle section is arranged to be pivoted around the first pivot axis from an operation position of the conveyor to a transport position and back to the operation position, and a second pivot axis 50 passes through the second end of the middle section to pivot a head section 103 sideways around the second pivot axis from the operation position of the conveyor which head section is connectable to the middle section through the second pivot axis, wherein the middle section 102 comprises a top plate 1, a bottom plate 2, and vertical side plates 3,4 which are fixed between the top plate and the bottom plate.

Example 2

The conveyor body according to example 1, wherein both vertical side plates 3,4 comprise a first fixing hole 5 for the first pivot axis 40 in the first end 102' of the middle section.

Example 3

The conveyor body according to example 1 or 2, wherein the top plate 1 and the bottom plate 2 both comprise a hole 14 for the second pivot axis 50 in the second end 102" of the middle section.

Example 4

The conveyor body according to any of examples 1 to 3, wherein the middle section 102 is narrowing towards the second end 102" of the middle section.

Example 5

The conveyor body according to any of examples 1 to 4, wherein the top plate 1 and the bottom plate 2 are narrowing towards the second end 102" of the middle section 102.

Example 6

The conveyor body according to any of examples 1 to 5, wherein front ends of the vertical side plates 3,4 are arranged from sides of the middle section inwards and converging towards the second end 102" of the middle section.

Example 7

The conveyor body according to any one of examples 1 to 6, wherein the first pivot axis 40 and the second pivot axis 50 are substantially perpendicular.

Example 8

The conveyor body 100 according to any of examples 1 to 7, comprising a load section 101 to which the middle section 102 is connected through the first pivot axis 40; and at least one first hydraulic cylinder 105 having a first end which is connected to the load section and a second end which is connected to a fixing part 3',4' comprised by the middle section.

Example 9

The conveyor body according to example 8, wherein the fixing part 3',4' is integrated to the vertical side plate and arranged to pass through a first opening 7 formed to the bottom plate 2.

Example 10

The conveyor body according to any of examples 1 to 9, wherein a second hydraulic cylinder 108 is connected to the middle section 102 to pivot the head section 103 around the second pivot axis 50.

Example 11

The conveyor body according to example 10, wherein the second hydraulic cylinder 108 is fixed to the top plate 1 or to the bottom plate 2.

Example 12

The conveyor body according to example 10, wherein the second hydraulic cylinder 108 is fixed to the side plate 3,4, and located above the top plate 1 or under the bottom plate 2.

Example 13

The conveyor body according to example 10, wherein the second hydraulic cylinder 108 is fixed between the top plate 1 and the bottom plate 2.

Example 14

The conveyor body 100 according to any of examples 1 to 13, comprising a head section 103 and the head section comprises an adapting part 107 having a pivot 24 in its first end which pivot is connected to the middle section 102 through the second pivot axis 50; and the conveyor body comprises a second hydraulic cylinder 108 having a first end which is connected to the middle section and a second end which is connected to an adapting part 107 comprised by the head section.

Example 15

The conveyor body according to example 14, wherein the adapting part 107 comprises: a lid 20; first vertical walls 21 at sides of the lid being arranged converging towards the first end of the adapting part; a second vertical wall 22 at a second end of the adapting part; and a bottom 23 to which said vertical walls 21,22 are fixed.

Example 16

The conveyor body according to example 14, wherein the head section 103 comprises: longitudinal beams 113 which are attached to the adapting part; and roller assembly supports 114 which are attached to the longitudinal beams. Preferably the longitudinal beams are open profiles in the longitudinal direction.

Example 17

A mineral material processing plant 200 comprising a mobile frame 201,202; at least one mineral material processing apparatus 201,203,206 attached to the frame; and at least one conveyor body 100 which comprises a middle section 102 having a first end 102' and a second end 102", and a first pivot axis 40 passes through the first end of the middle section, and the middle section is arranged to be pivoted around the first pivot axis from an operation position of the conveyor to a transport position and back to the operation position, and a second pivot axis 50 passes through the second end of the middle section to pivot a head section 103 sideways around the second pivot axis from the operation position of the conveyor which head section is connectable to the middle section through the second pivot axis, wherein the middle section 102 comprises a top plate 1, a bottom plate 2, and vertical side plates 3,4 which are fixed between the top plate and the bottom plate.

Example 18

The processing plant according to example 17, wherein the middle section 102 is pivoted to the substantially vertical position and a head section 103 connected to the middle section is pivoted to a substantially horizontal position beside a longitudinal side of the processing plant when the conveyor body 100 is pivoted to the transport position.

Example 19

The processing plant according to example 17 or 18 comprising as the mineral material processing apparatus at least one of the following: a feeder 203, a pre-screen, a screen, a crusher 201, a discharge conveyor 206.

The foregoing description provides non-limiting examples of some embodiments of the invention. It is clear to a person skilled in the art that the invention is not restricted to details presented, but that the invention can be implemented in other equivalent means.

Some of the features of the above-disclosed embodiments may be used to advantage without the use of other features. As such, the foregoing description shall be considered as merely illustrative of the principles of the invention, and not in limitation thereof. Hence, the scope of the invention is only restricted by the appended patent claims.

I claim:

1. A conveyor configured to convey mineral material comprising:
   a body;
   the body comprising a middle section including a top plate, a bottom plate, and vertical side plates which are fixed between the top plate and the bottom plate;
   the body further comprising a load section pivotally connected through a first pivot axis to a first end of the middle section, wherein the middle section is arranged to be pivoted around the first pivot axis from an operation position of the conveyor to a transport position and back to the operation position;
   the middle section comprising a second end pivotally connected through a second pivot axis to ahead section, wherein the head section is arranged to be pivoted sideways around the second pivot axis from the operation position of the conveyor; and
   at least one hydraulic cylinder having a first end which is connected to the load section and a second end which is connected to a fixing part integrated to the vertical side plate and arranged to pass through a first opening formed in the bottom plate.

2. The conveyor according to claim 1, wherein both vertical side plates include a first fixing hole for the first pivot axis in the first end of the middle section.

3. The conveyor according to claim 1, wherein the top plate and the bottom plate both include a hole for the second pivot axis in the second end of the middle section.

4. The conveyor according to claim 1, wherein the middle section narrows towards the second end of the middle section.

5. The conveyor according to claim 1, wherein the top plate and the bottom plate narrow towards the second end of the middle section.

6. The conveyor according to claim 1, wherein front ends of the vertical side plates are arranged from sides of the middle section inwards and converging towards the second end of the middle section.

7. The conveyor according to claim 1, wherein the first pivot axis and the second pivot axis are substantially perpendicular.

8. A conveyor configured to convey mineral material comprising:
   a body;
   the body comprising a middle section including a top plate, a bottom plate, and vertical side plates which are fixed between the top plate and the bottom plate, wherein the middle section is arranged to be pivoted around a first pivot axis passing through a first end of the middle section from an operation position of the conveyor to a transport position and back to the operation position;
   the middle section comprising a second end pivotally connected through a second pivot axis to a head section, wherein the head section is arranged to be pivoted sideways around the second pivot axis from the operation position of the conveyor; and
   a hydraulic cylinder connected to the middle section to pivot the head section around the second pivot axis, wherein hydraulic cylinder is fixed to the top plate or to the bottom plate, or to one of the side plates above the top plate or under the bottom plate.

9. A conveyor configured to convey mineral material comprising:
   a body;
   the body comprising a middle section including a top plate, a bottom plate, and vertical side plates which are fixed between the top plate and the bottom plate, wherein the middle section is arranged to be pivoted around a first pivot axis passing through a first end of the middle section from an operation position of the conveyor to a transport position and back to the operation position;
   the body further comprising a head section including an adopting part that comprises a pivot in its first end, a lid, first vertical walls at sides of the lid being arranged converging towards the first end of the adapting part, a second vertical wall at a second end of the adapting part, and a bottom to which said vertical walls are fixed;
   a second end of the middle section pivotally connected through a second pivot axis to the pivot in the first end of the head section, wherein the head section is arranged to be pivoted sideways around the second pivot axis from the operation position of the conveyor; and
   a hydraulic cylinder having a first end which is connected to the middle section and a second end which is connected to the adapting part of the head section.

10. The conveyor according to claim 9, wherein the head section comprises: longitudinal beams which are attached to the adapting part; and roller assembly supports which are attached to the longitudinal beams.

11. A mineral material processing plant comprising:
a mobile frame;
at least one mineral material processing apparatus attached to the frame;
at least one conveyor which comprises a body;
the body comprising a middle section including a top plate, a bottom plate, and vertical side plates which are fixed between the top plate and the bottom plate, wherein the middle section is arranged to be pivoted around a first pivot axis passing through a first end of the middle section front an operation position of the conveyor to a transport position and back to the operation position;
the middle section comprising a second end pivotally connected through a second pivot axis to ahead section, wherein the head section is arranged to be pivoted sideways around the second pivot axis from the operation position of the conveyor; and
a hydraulic cylinder connected to the middle section to pivot the head section around the second pivot axis, wherein the hydraulic cylinder is fixed to the top plate or to the bottom plate, or to one of the side plates above the top plate or under the bottom plate.

12. The processing plant according to claim 11, wherein the middle section is pivoted substantially to the vertical position and a head section connected to the middle section is pivoted to a substantially horizontal position beside a longitudinal side of the processing plant when the conveyor is pivoted to the transport position.

13. The processing plant according claim 11, comprising as the mineral material processing apparatus at least one of the following: a feeder, a pre-screen, a screen, a crusher, a discharge conveyor.

14. The processing plant according to claim 11, wherein the processing plant is a mobile processing plant.

15. The processing plant according to claim 11, wherein both vertical side plates include a first fixing hole for the first pivot axis in the first end of the middle section.

16. The processing plant according to claim 11, wherein the top plate and the bottom plate both include a hole for the second pivot axis in the second end of the middle section.

17. The processing plant according to claim 11, wherein the middle section narrows towards the second end of the middle section.

18. The processing plant according to claim 11, wherein the top plate and the bottom plate narrow towards the second end of the middle section.

19. The processing plant according to claim 11, wherein front ends of the vertical side plates are arranged from sides of the middle section inwards and converging towards the second end of the middle section.

20. The processing plant according to claim 11, wherein the first pivot axis and the second pivot axis are substantially perpendicular.

21. The processing plant according to claim 11, wherein a load section is pivotally connected to the first end of the middle section through the first pivot axis, and at least one second hydraulic cylinder connected at a first end to the load section and connected at a second end to a fixing part on the middle section.

22. The processing plant according to claim 21, wherein the fixing part is integrated to the vertical side plate and arranged to pass through a first opening formed in the bottom plate.

* * * * *